United States Patent [19]

Thunnissen

[11] Patent Number: 4,898,509

[45] Date of Patent: Feb. 6, 1990

[54] CARGO TRANSPORTER, PARTICULARLY OF THE TRAILER TYPE HAVING A FRONT ELEVATED LOADING FLOOR

[75] Inventor: Kees W. Thunnissen, Boslaan, Netherlands

[73] Assignee: Talson Transport Engineering, B.V., Heeze, Netherlands

[21] Appl. No.: 33,016

[22] Filed: Mar. 31, 1987

[51] Int. Cl.$^4$ ............................................. B60P 1/44
[52] U.S. Cl. ............................ 414/495; 254/93 HP; 254/122
[58] Field of Search ............... 414/495; 254/93 HP, 254/122; 182/141; 187/8.72, 18

[56] References Cited

U.S. PATENT DOCUMENTS

| | | | |
|---|---|---|---|
| Re. 26,907 | 6/1970 | Barker | 187/18 X |
| 2,617,547 | 11/1952 | Pridy | 414/495 X |
| 3,174,722 | 3/1965 | Alm | 254/93 HP |
| 3,308,845 | 3/1967 | Bellas et al. | 414/495 X |
| 3,712,495 | 1/1973 | Carder | 414/503 |
| 3,730,366 | 5/1973 | Berends | 414/495 |
| 3,982,718 | 9/1976 | Folkenroth et al. | 254/122 X |
| 4,043,569 | 8/1977 | Ratliff | 280/423 R |
| 4,174,188 | 11/1979 | Brun | 254/93 HP X |
| 4,474,359 | 10/1984 | Weaver | 414/495 X |
| 4,655,466 | 4/1987 | Hanoaka | 187/18 X |
| 4,688,760 | 8/1987 | Garman et al. | 254/93 HP |

FOREIGN PATENT DOCUMENTS

| | | | |
|---|---|---|---|
| 153032 | 8/1985 | European Pat. Off. | 414/495 |
| 219151 | 4/1987 | European Pat. Off. | 414/495 |
| 1100906 | 6/1958 | Fed. Rep. of Germany . | |
| 1964045 | 6/1971 | Fed. Rep. of Germany . | |
| 3519875 | 12/1986 | Fed. Rep. of Germany | 254/122 |
| 787809 | 9/1935 | France . | |
| 8104401 | 4/1983 | Netherlands . | |
| 1051749 | 12/1966 | United Kingdom . | |

Primary Examiner—David A. Bucci
Attorney, Agent, or Firm—Helfgott & Karas

[57] ABSTRACT

Cargo-transporter, particularly of the trailer type, having a loading floor, in which a loading floor portion situated directly behind another elevated loading floor portion but in front of the wheel assembly, includes a lifting platform having a lifting height corresponding to the difference in the loading floor levels. An apparatus for guiding and lifting the platform is accommodated in a space below the platform. The transporter is of the self-supporting type. The lifting platform is vertically movably guided and has a length substantially corresponding to the length of the elevated loading floor portion. A guiding and elevating apparatus is accommodated in a cup-shaped housing secured against a transporter bottom and having a height corresponding to the lifting height of the platform. The lifting platform is provided at its end edge remote from the elevated loading floor portion with a downwardly extending skirt extending in the lowered position of the lifting platform to be adjacent the housing bottom.

9 Claims, 3 Drawing Sheets

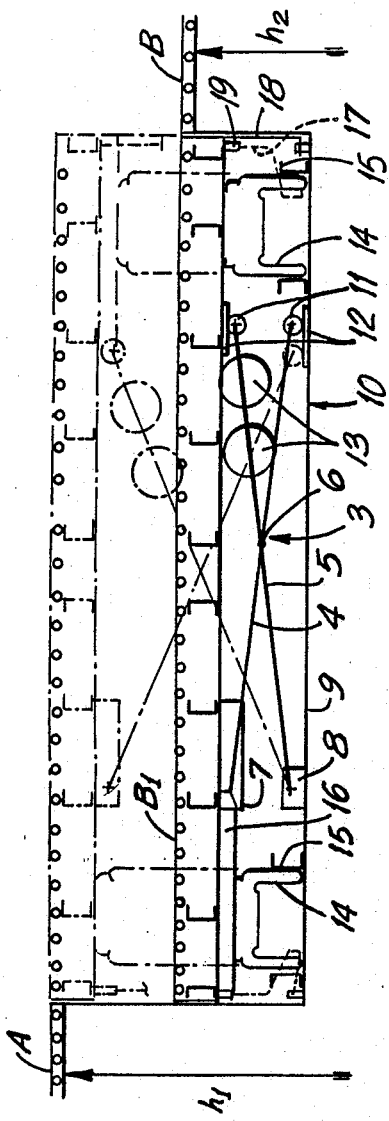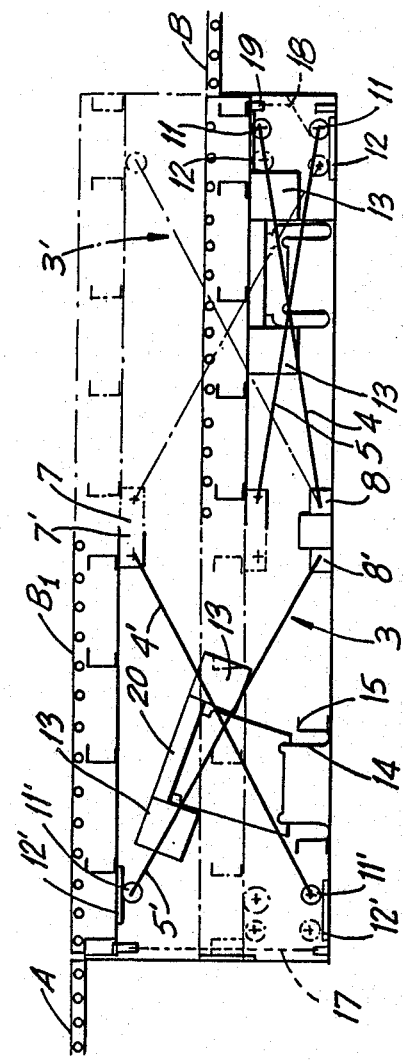

CARGO TRANSPORTER, PARTICULARLY OF THE TRAILER TYPE HAVING A FRONT ELEVATED LOADING FLOOR

BACKGROUND OF THE INVENTION

The invention relates to a cargo-transporter, more particularly a gooseneck trailer, having a front elevated loading floor, a portion of the loading floor being located directly behind the elevated loading floor section but in front of the rear wheel assembly. That portion is constructed as a lifting platform which has a lifting height corresponding to the difference in the loading floor level. An apparatus for guiding and lifting of the platform is accommodated in a space below the platform. A transporter of this type is known. The choice of a gooseneck trailer, i.e. a trailer having a "stepped" loading floor has to do with the circumstance that, on the one hand, a largest possible effective loading height above the major section of the loading floor and consequently a largest possible loading volume is aimed at, while, on the other hand, official rules impose a maximum to the total trailer height (in most countries 4 meters) and for technical reasons a minimum height (of e.g. 1.25 m) is required for supporting the front part (i.e. the goose neck of the trailer onto the so-called fifth wheel of the tractor. Moreover the total length of a tractor-trailer combination is limited to a maximum as laid down in official rules. Due to these restricting factors one has proceeded to lower the loading floor height in those points where this is possible—i.e. with the exception of the front part of the trailer—relative to the minimum supporting height (of e.g. 1.25 m) to e.g. 80 cms and to design the wheel assembly of the trailer correspondingly lower. Up to now a trailer of this type has been satisfactory for the transport of various kinds of loads.

It is also known to design a load floor portion situated directly behind the elevated load floor section as a lifting platform in order to permit loads, such as pallets, which have been loaded at the lowest loading floor level, to be elevated to the level of the elevated loading floor section without the help of a self-contained lifting apparatus. In a well-known construction of this kind the loading floor portion serving as a lifting platform is performing a combined upward and forward movement in the lifting mode. Moreover, the well-known lifting platform has a relatively short length.

SUMMARY OF THE INVENTION

It is an object of this invention to improve such a trailer having a stepped loading floor so as to solve a problem which has been encountered in the field of the air cargo containers or pallets and which is due to the increased dimensions (more particularly the increased height) of such containers. Air cargo containers have a width adapted to the interior width of a trailer and a length of more than 3 meters. Until recently the height of such containers or pallets did not exceed about 2.5 m. This implied that for the transport along the road of such containers a normal tractor-trailer combination having a flat loading floor provided with roller tracks, could be used. Since the introduction of air planes of the jumbojet type, however, there has been an increasing use of air cargo containers having a height of almost 3 meters. Such a height is adapted to the possibilities of this airplane type but cannot be handled by a flat trailer.

Industries have conformed to this situation developing a special type of trailer having a lowered loading floor accommodating three of such pallets have a height of almost 3 meters. Furthermore a special truck was designed to accommodate two additional containers of smaller height therein. This implied a number of complicated and expensive constructions which were indispensible for reducing the length occupied by the cab and the coupling apparatus to a minimum and thereby to permit continued restriction to just within the permitted maximum total length of 18 meters. It is true that in this manner an optimum loading capacity is obtained, but in opinion of the practisizers too much concessions have been made to the comfort and particularly to the safety of the driver. For this reason even in some countries the relevant combination has been prohibited. Moreover, this special tractor-trailer combination is less universal and flexible than the more conventional combinations.

An important disadvantage of the invention is that the parts of the combination cannot be substituted by those of the more conventional combination.

Therefore the conclusion has to be drawn that the problem as indicated above has not been satisfactorily solved up till now.

Therefore the invention proposes on the basis of the above mentioned recognition a cargo-transporter of the initially described type which is characterized in that the transporter is of the self-supporting type, that the lifting platform is vertically movably guided and has a length which substantially corresponds to the length of the elevated loading floor portion, while the guiding and elevating apparatus is accommodated in a cup-shaped housing secured against the bottom of the vehicle and having a height corresponding to the lifting height of the platform, the lifting platform being provided at its end edge remote from the elevated loading floor portion with a downwardly extending skirt which extends in the lowered position of the lifting platform to adjacent the housing bottom.

The cargo-transporter according to the invention offers the possibility to accommodate on the lower loading floor portion three airplane pallets having a height of almost 3 m, while the higher loading floor portion in the front may be used for accommodating an airplane pallet having a smaller height. For that purpose first the lower airplane pallet is slid along the loading floor forwardly till it arrives on the loading floor section serving as the lifting platform, whereafter this pallet is elevated to the level of the higher loading floor portion by means of the lifting platform and thereafter is slid forwardly onto the higher loading floor portion. When thereafter the lifting platform has again been lowered to its lower position the three higher pallets may be slid forwardly in the usual manner one after the other from the back end of the loading floor.

In that the cargo-transporter according to the invention is of self-supporting construction—this means that it derives its strength and rigidity not from a chassis but from the sidewalls—the transverse beams which are conventional for a stationary loading floor may be simply omitted at the position of the loading floor portion constituting the lifting platform. The supporting function of said transverse beams may then simply be taken over by a cup-shpaed housing secured to the bottom of the vehicle, said housing accommodating the guiding and lifting apparatus for the lifting platform.

In a further preferable embodiment according to the invention the guiding and lifting apparatus comprises at least two shears links situated in vertical planes, each along one of two opposite sides of the platform, the four shears link ends situated at one longitudinal end being articulated to the lifting platform and the stationary base structure, respectively, and the four shears links situated at the other longitudinal end rollingly engaging parallel supporting surfaces on the platform and the stationary base structure respectively.

Preferably the guiding and lifting apparatus further comprises one or more air bellows supported on the bottom of the cup-shaped housing and serving as lifting means, said bellows being supplied with air from pressurized air tanks likewise accommodated in the cup-shaped housing.

According to a further feature of the invention the shears links of both shears extending closest to the longitudianl axis of the vehicle are mutually parallel and said shears links are mutually connected by hollow torsion bodies serving as the pressurized air tanks.

The invention is further explained below with reference to the drawing of some embodiments given as examples.

BRIEF DESCRIPTION OF THE DRAWINGS

FIG. 2 is a schematic longitudinal section through the loading floor portion constructed as a lifting platform, in a first embodiment;

FIG. 3 is a schematic longitudinal section through the loading floor portion constructed as a lifting platform, in a second embodiment.

DETAILED DESCRIPTION OF THE PREFERRED EMBODIMENTS

Figure 1B:
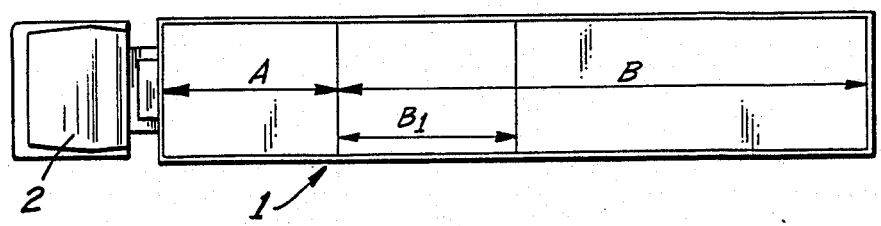
FIGS. 1A and 1B show a schematic side elevation and a plan view, respectively, of a tractor and trailer according to the invention.
Figure 1A:
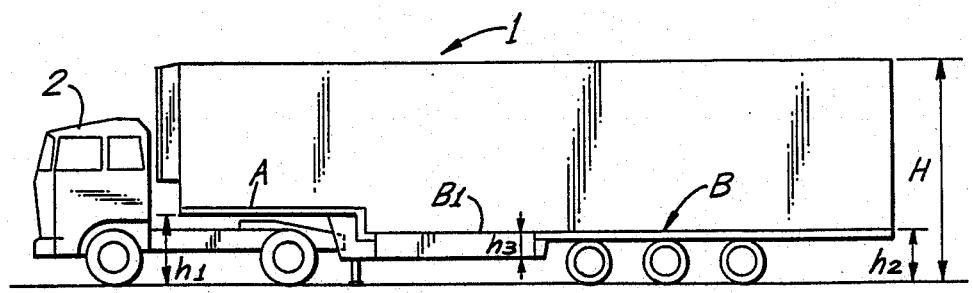

The trailer 1 of the tractor-trailer combination shown in FIGS. 1A and 1B has a "stepped" loading" floor having a front section A situated at a level $h_1$ and a back section B situated at a lower level $h_2$.

The level $h_1$ is determined by the height of the coupling disc 2' of the tractor 2 and is e.g. 1.25 m, while the height $h_2$ is e.g. 85 cm. In the embodiment shown the front loading floor section A covers about a quarter of the total loading floor length.

According to the invention the front portion $B_1$ of the back loading floor section B is constructed vertically displaceable such that this loading floor portion may be elevated from the level $h_2$ to the level $h_1$ of the front loading floor section A. The loading floor section $B_1$ thereby constitutes a lifting platform whereby a load (e.g. an airplane pallet having a height smaller than $H-h_1$) may be elevated from the level $h_2$ to the level $h_1$ in order thereafter to be permitted to be slid from the lifting platform onto the front loading floor section A. In the example shown the portion $B_1$ covers about one third of the loading floor section B and therefore about a quarter of the total loading floor length.

The guiding and lifting apparatus which is necessary for moving the lifting platform $B_1$ is accommodated in a cup-shaped housing 10 having an interior height $h_3$, as measured from its bottom to the upper surface of the load floor section B, corresponding with or being slightly in excess of the level difference $h_1$ minus $h_2$.

The lifting platform $B_1$ and particularly the guiding and lifting apparatus therefore are further described with reference to FIGS. 2–4.

In the embodiment according to FIG. 2 the lifting platform $B_1$ is supported by two shears links 3 situated in vertical planes and each adjacent to a longitudinal edge of the lifting platform, the shears legs of which have been indicated 4 and 5 and the articulations have been indicated 6. In FIG. 2 both shears links are positioned one behind the other so that only one is visible. All leg or link ends of both shears links situated at the same longitudinal end (in the drawing to the left) are articulated to the lifting platform at 7 and to a bracket 8 on the bottom 9 of the cup-shaped housing 10, respectively, said housing being provided between the upper and lower loading floor sections A and B and below the lifting platform $B_1$. The leg ends situated at the other longitudinal end (in FIG. 2 to the right) each carry a roller 11 whereby they longitudinally rollingly engage a supporting plate 12 on the bottom 9 of the housing 10 and the lower side of the lifting platform $B_1$, respectively.

The shears links with legs 4 and 5 of both shears are furthermore mutually situated such (in the transverse direction) that the legs 5 of both shears are closest to the central longitudinal axis of the vehicle. The shear legs 5, each belonging to one of both shears, extend mutually parallel and are mutually connected by torsion boxes 13 ensuring a synchronous articulated movement of both shears and thereby an accurate vertical guidance of the lifting platform.

In order to bring the lifting platform $B_1$ from the lowered position indicated by solid lines in the drawing to the position indicated by broken lines at each end of the platform (in FIG. 2 to the left and to the right) two air bellows 14 are used. Said air bellows are each accommodated with their lower end in a frame 15 standing up from the bottom 9 of the cup-shaped housing 10 and engage with their upper ends the lower side 16 of the lifting platform $B_1$. When pressurized air is supplied to the air bellows 14 they expand vertically and thereby move the lifting platform $B_1$ upwardly. Chains 17 provided at the front and back ends of the lifting platform $B_1$ limit the elevating height of the lifting platform $B_1$ to a level in which the upper side of the lifting platform, constituted by roller tracks, are flush with the roller tracks constituting the upper side of the higher loading floor section A. The torsion boxes 13 function as pressurized air tanks and as the pressurized air source for supplying the air bellows. Flexible conduits, not further shown in the drawing, constitute the connection between the pressurized air tanks 13 and the air bellows 14, while control valve means, likewise not shown, are used for supplying pressurized air from the pressurized air tanks to the bellows for selectively elevating the lifting platform, or for releasing pressurized air from the air bellows in order to lower the lifting platform.

As shown in FIG. 2 the lifting platform $B_1$ is provided at its back end (in the drawing to the right), with a downwardly extending skirt 18 which in the lowered position of the lifting platform $B_1$ is close to the back sidewall 19 of the housing 10 and extends with its lower end to adjacent the bottom 9 of the housing 10. In the elevated position of the platform $B_1$ the skirt 18 closes the vertical opening between the platform and the lower loading floor section B which enhances the safety when elevating and lowering the platform $B_1$.

In the embodiment according to FIG. 3 two shears links 3 and 3' are used at both sides of the lifting platform $B_1$, the fixed articulations 7, 8 and 7', 8' of both pairs of shear links all being situated adjacent to the central transverse plane of the lifting platform $B_1$. The torsion boxes 13 which also in this embodiment are used as the pressurized air tanks have here a square cross-sectional shape and are mutually spaced and mutually connected in the longitudinal direction such that they enclose the upper ends of both air bellows 14 relatively closely. The air bellows 14 therewith do not press directly against the lower side of lifting platform $B_1$ but against the connecting bridge 20 between the relative tanks 13. Said tanks or torsion boxes respectively are further situated with reference to the relative shears legs 5 such that in the lowered position of the lifting platform $B_1$ they flatly engage the top of the frames enclosing the lower ends of the air bellows 14.

For the rest, the construction of the embodiment according to FIG. 3 is equal to that of the embodiment according to FIG. 2. Corresponding parts are indicated in FIG. 3 with the same reference numbers as in FIG. 2.

Figure 4:
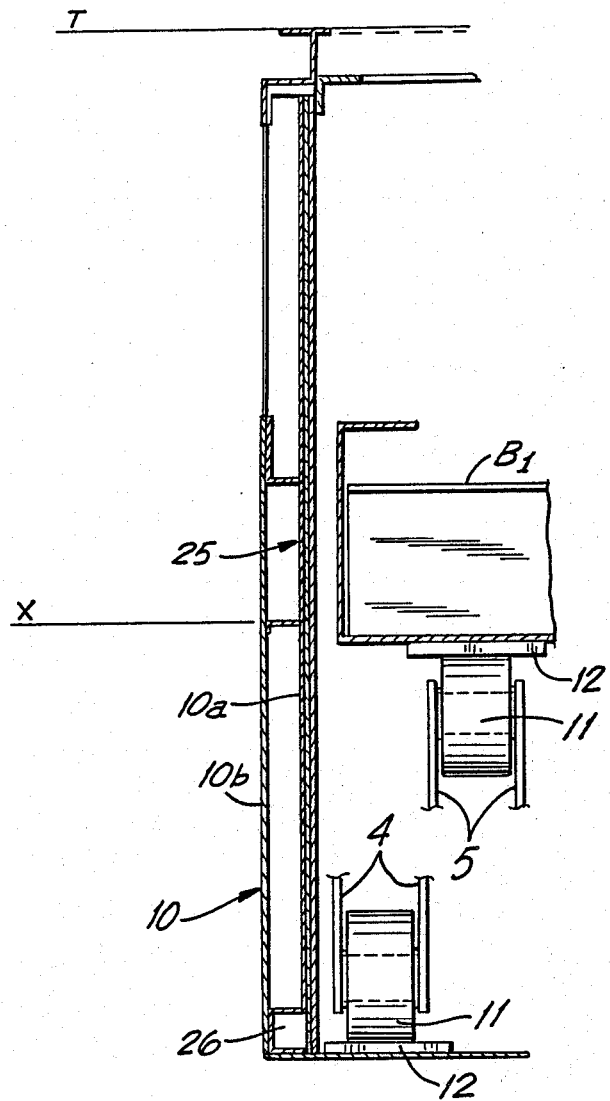
FIG. 4 is a cross-section showing the connection of the cup-shaped housing against the bottom part of a self-supporting sidewall.

For securing the cup-shaped housing 10 against the bottom of the vehicle, reference is made to FIG. 4 showing a cross-section of a sidewall of the cargo-transporter according to the invention. The portion of the sidewall structure situated between the roof level T and the level X substantially corresponds to that of the sidewall of a known trailer having a stepped loading floor. In the known embodiment the level X constitutes the lower edge of the sidewall of the vehicle and the section body indicated 25 in FIG. 4 constitutes the engaging surface for the end flanges of the transverse beams extending to the right of that body, of the stationary lower loading floor portion. According to the invention said transverse beams have been omitted along the length of the desired lifting platform and have been replaced by the above mentioned cup-shaped housing 10. This housing has a double sidewall, the interior wall 10a of which being bolted against the interior side of the section body 25, and the outer sidewall 10b has been secured as outer plating against the lower portion of the "original" sidewall. At the lower end the double sidewall 10a, 10b has been rigidified with a box section 26. Furthermore in FIG. 4 the supporting plates 12 are visible which are provided on the bottom 9 of the housing 10 and against the lower sie of the lifting platform $B_1$ respectively and serve as roller support for the shear links structure provided along the relative sidewall. It will be clear hereby that a known trailer of the self-supporting type and provided with a "stepped" loading floor may be relatively simply rebuilt into a vehicle according to the invention without essential changes have to be provided in the base structure of the known vehicle. The "adaptation" to the transporter according to the invention is mainly restricted to omitting a portion of the lowered loading floor section and securing the cup-shaped housing as a unity, together with the lifting platform which has been completely assembled therein.

I claim:

1. Cargo-transporter, particularly of the trailer type, comprising a loading floor including at a front thereof a first portion which is elevated, and a second portion situated directly behind the elevated first portion, said second portion including a section formed as a lifting platform having a lifting height corresponding to a difference in levels between said first and second portions, an apparatus for guiding and lifting said platform accommodated in a space below said platform, said transporter being self-supporting, said lifting platform being vertically movably guided and having a length substantially corresponding to the length of the elevated first loading floor portion, said guiding and lifting apparatus being accommodated in a cup-shaped housing secured against a bottom of the vehicle and having a height corresponding to the lifting height of the platform, said guiding and lifting apparatus comprising two linkage systems interconnected by transverse torsion means and adapted to lift said lifting platform so that said lifting platform is moved upward vertically without simultaneously moving in a forward direction, the lifting platform being provided at an end edge thereof remote from the elevated loading floor portion with a downwardly extending skirt which extends in a lowered position of the lifting platform up to a bottom of said housing.

2. Transporter according to claim 1, wherein said linkage systems comprise at least two shears links situated in two vertical planes, each along one of two opposite sides of the platform, and wherein four ends of the shears links situated at one longitudinal end of the links are articulated to the lifting platform and the bottom of said housing, respectively, and four ends of the shears links situated at another longitudinal end are rollably engaged with parallel supporting surfaces of the platform and said bottom of said housing, respectively.

3. Transporter according to claim 2, wherein the shears links situated closest to a longitudinal axis of the vehicle extend mutually parallel and are mutually connected by at least one torsion box which forms said torsion means.

4. Transporter according to claim 1, wherein the guiding and lifting apparatus further comprises at least one air bellows supported by a bottom of the cup-shaped housing, said bellows being supplied with air from at least one pressurized air tank accommodated in the cup-shaped housing.

5. Transporter according to claim 4, wherein said torsion means includes at least one torsion box which is constituted by a pressurized air tank and is connected to the air bellows.

6. Transporter according to claim 5, in which the shears links are mutually connected by two torsion boxes serving as pressurized air tanks, characterized in that the torsion boxes have at least one flat side and are positioned in such a position between the shears links that in a lowered position of the lifting platform they engage with said flat sides a lower end of a frame upstanding from the bottom of the cup-shaped housing and enclosing the air bellows, a upper end of the air bellows being accommodated in a space between both boxes and engaging a lower side of a bridge piece connecting both boxes.

7. Transporter according to claim 1, wherein said two linkage systems are positioned in vertical planes at two opposing ends of said lifting platform.

8. Transporter according to claim 1, wherein said two linkage systems are positioned at two sides relative to a longitudinal axis of said lifting platform.

9. Transporter according to claim 1, further comprising means for lifting an elevating height of said lifting platform.

* * * * *